(12) United States Patent
Aggarwal

(10) Patent No.: US 12,223,122 B1
(45) Date of Patent: Feb. 11, 2025

(54) METHOD OF SYSTEM OF PROVIDING LOCAL PERSONALIZED EMOTICON RECOMMENDATION

(71) Applicant: Microsoft Technology Licensing, LLC, Redmond, WA (US)

(72) Inventor: Rajat Aggarwal, Noida (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/524,785

(22) Filed: Nov. 30, 2023

(51) Int. Cl.
*G06F 3/023* (2006.01)
*G06F 40/284* (2020.01)
*G06F 40/40* (2020.01)
*H04L 51/04* (2022.01)
*H04L 51/216* (2022.01)

(52) U.S. Cl.
CPC .......... *G06F 3/0237* (2013.01); *G06F 40/284* (2020.01); *G06F 40/40* (2020.01); *H04L 51/04* (2013.01); *H04L 51/216* (2022.05)

(58) Field of Classification Search
CPC ...... G06F 3/0237; G06F 40/40; G06F 40/284; H04L 41/216; H04L 51/04
USPC ......................................................... 345/168
See application file for complete search history.

(56) References Cited

U.S. PATENT DOCUMENTS

2017/0185581 A1 6/2017 Bojja et al.
2019/0079644 A1* 3/2019 Kim ........................ G06N 20/00
2019/0258381 A1 8/2019 Desjardins
2021/0103610 A1* 4/2021 Lee ........................ G06F 16/444
2023/0239262 A1 7/2023 Rai

OTHER PUBLICATIONS

Guibon, et al., "Emoji Recommendation in Private Instant Messages", In Proceedings of the 33rd Annual ACM Symposium on Applied Computing, Apr. 2018, 5 Pages.
Kim, et al., "No More One Liners: Bringing Context into Emoji Recommendations", In Journal of ACM Transactions on Social Computing, vol. 3, Issue 2, Apr. 2020, 25 Pages.

(Continued)

*Primary Examiner* — Calvin C Ma
(74) *Attorney, Agent, or Firm* — NovoTechIP International PLLC

(57) ABSTRACT

A system and method for providing local emoticon recommendations includes receiving an indication of a need for a user to utilize an emoticon in a communication between the user and one or more other users, the indication being received via a user interface screen of an application installed on the client device and retrieving a text segment for which the emoticon will be used, and contextual data associated with the text segment. The text segment and contextual data are tokenized to generate one or more words and a natural language library is queried to generate a part-of-speech (POS) tag set for each of the words. The POS tag set is then sent to a local machine learning (ML) model trained for providing emoticon recommendations and the model is executed on the client device to provide one or more emoticon recommendations. The recommendations are displayed as user selectable recommendations. The local ML model is trained via ongoing training, wherein training the local ML model includes associating each POS tag set in a list of POS tag sets with ranked emoticons.

20 Claims, 14 Drawing Sheets

```
javascript const data = [

{ text: "I'm so happy today",emoticon: " 😄 " },

{ text: "This is a great movie", emoticon: " 👍 " },

{ text: "Feeling tired", emoticon: " 😪 " },

{ text: "I love coding", emoticon: " 😀 " },

{ text: "This weather is awful", emoticon: " 😒 " },

];
```

(56) References Cited

OTHER PUBLICATIONS

Mahte, et al., "Emoticon Suggestion with Word Prediction using Natural Language Processing", In International Research Journal of Engineering and Technology, vol. 07 Issue 5, May 19, 2020, pp. 3104-3108.

Miklos, Balint, "Express yo'self with Emoji in Smart Reply", Retrieved From: https://www.blog.google/products/gmail/express-yourself-with-emoji-in-smart-reply/, Mar. 31, 2016, 4 Pages.

Shoeb, et al., "Assessing Emoji Use in Modern Text Processing Tools", In Proceedings of the 59th Annual Meeting of the Association for Computational Linguistics, Aug. 1, 2021, pp. 1379-1388.

Urabe, et al., "Emoticon Recommendation System to Richen Your Online Communication", In International Journal of Multimedia Data Engineering and Management, vol. 5, Issue 1, Mar. 2014, 21 Pages.

* cited by examiner

```
javascript const data = [

{ text: "I'm so happy today", emoticon: "😄" },

{ text: "This is a great movie", emoticon: "👍" },

{ text: "Feeling tired", emoticon: "😪" },

{ text: "I love coding", emoticon: "😁" },

{ text: "This weather is awful", emoticon: "☹" },

```javascript
const DecisionTree = require('decision-tree-js');

// Create a mapping of emoticons to numerical labels
const emoticonToLabel = {
    "😀" : 0,
    "✋" : 1,
    "😵" : 2,
    "😊" : 3,
    "😞" : 4,
};
// convert text messages into numerical features
const x = data.map((item => item.text.toLowerCase().split(' ')));
const y = data.map((item => emoticonToLabel[item.emoticon]));
```

FIG. 3B

```
javascript const natural = require ('natural') ;
const tokenizer = new natural. WordTokenizer () ;
const pos = new natural. BrillPOSTagger () ;

// Sample text
const text = "The quick brown fox jumps over the lazy dog.";

// Tokenize the text into words
const words = tokenizer . tokenize (text) ;

// Tag the words with POS
const taggedWords = pos . tag (words) ;

console . log (taggedWords) ;
```

FIG. 3C javascript

[
 ['The', 'DT'],
 ['quick', 'JJ'],
 ['brown', 'NN'],
 ['fox', 'NN'],
 ['jumps', 'VBZ'],
 ['over', 'IN'],
 ['the', 'DT'],
 ['lazy', 'JJ'],
 ['dog', 'NN'],
 ['.', '.']
]

FIG. 3D

```
function recommendEmoticon (text) {
    const inputFeatures = text . toLowerCase () . split (' ') ;
    const predictedLabel = dt . predict (inputFeatures) ;
    const recommendedEmoticon = Object . keys (emoticonToLabel) . find (key => emoticonToLabel [key] === predictedLabel)
    return recommendedEmoticon;
}

// Example usage
const userText = "I'm feeling great today" ;
const recommendedEmoticon = recommendEmoticon (userText);
console . log ("Recommended emoticon:" , recommendedEmoticon);
```

FIG. 3E

METHOD OF SYSTEM OF PROVIDING LOCAL PERSONALIZED EMOTICON RECOMMENDATION

BACKGROUND

In today's fast-paced environment where users frequently communicate with many different individuals via different communication mechanisms such text messaging, instant messaging and social media interactions, saving time when responding to a message or drafting an initial message is of outmost importance to most users. In order to save time in writing and/or to show creativity, many users utilize emoticons to express themselves. To cover many different emotions and/or scenarios for which an emoticon can be used, different communication platforms offer a significantly large number of emoticons for users to choose from. This results in the users having to spend a large amount of time searching for the right emoticon from among the tens, hundreds or thousands of emoticons offered, and often feeling overwhelmed and/or frustrated by the experience.

To address this issue, different platforms offer different mechanisms for organizing the emoticons into different groups, for enabling the users to search for an emoticon, and/or for providing emoticon recommendations based on a number of different parameters. Whiles these mechanisms make it somewhat easier to find the right emoticon, they raise other issues such as privacy concerns, slow computer response time, costly use of computing resources and the like.

Hence, there is a need for improved systems and methods of providing emoticon recommendations.

SUMMARY

In one general aspect, the instant disclosure presents a client device having a processor and a memory in communication with the processor wherein the memory stores executable instructions that, when executed by the processor alone or in combination with other elements, cause the client device to perform multiple functions. The function may include tokenizing one or more text segments to generate one or more words from the one or more text segments, the one or more text segments being received as part of an input data received by an application that offers use of emoticons in communications between users; querying a natural language library to generate a part-of-speech (POS) tag set for each of the one or more words; providing the generated POS tag set to a local machine learning (ML) model trained for providing emoticon recommendations based on the POS tag set and a library of emoticons; executing the local ML model on the client device to provide one or more emoticon recommendations; displaying the one or more emoticon recommendations to the user as user selectable recommendations; and implementing ongoing training on the local ML model, wherein training the local ML model includes associating each POS tag set in a list of POS tag sets with ranked emoticons.

In yet another general aspect, the instant disclosure presents a method for providing local emoticon recommendations by a client device. In some implementations, the method includes receiving an indication of a likelihood for a user to utilize an emoticon in a communication between the user and one or more other users, the indication being received via a user interface screen of an application installed on the client device; retrieving a text segment from the application, the text segment being a text segment for which the emoticon will be used; retrieving contextual data associated with the text segment; tokenizing the text segment and the contextual data to generate one or more words from the text segment and the contextual data; querying a natural language library to generate a POS tag set for each of the one or more words; providing the generated POS tag set to a ML model trained for providing emoticon recommendations based on the POS tag set; executing the local ML model on the client device to provide one or more emoticon recommendations; displaying the one or more emoticon recommendations to the user as user selectable recommendations; and implementing ongoing training to the local ML model, wherein training the local ML model includes associating each POS tag set in a list of POS tag sets with ranked emoticons.

In a further general aspect, the instant application describes a non-transitory computer readable medium on which are stored instructions that when executed cause a programmable device to perform functions of tokenizing one or more text segments to generate one or more words from the one or more text segments, the one or more text segments being received as part of an input data received in an application that offers use of emoticons in communications between two or more users; querying a natural language library to generate a POS tag set for each of the one or more words; providing the generated POS tag set to a ML model trained for providing emoticon recommendations based on the POS tag set and a library of converted emoticons; executing the local ML model on the programmable device to provide one or more emoticon recommendations; displaying the one or more emoticon recommendations to the user as user selectable recommendations; and providing ongoing training to the local ML model, wherein training the local ML model includes associating each POS tag set in a list of POS tag sets with ranked emoticons.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 3A depict an example of a simplified dataset that may be used for an initial training of an emoticon recommendation model.

FIG. 3B depicts an example of mapping of emoticons to numerical labels and converting text segments to numerical features.

FIG. 3C depicts an example of using the Natural library to tokenize and tag words.

FIG. 3D depicts an example of a set of word-POS tag pairs.

FIG. 3E depicts an example of providing an input text to an emoticon recommendation model and receiving a recommended emoticon as an output.

DETAILED DESCRIPTION

Figure 1:
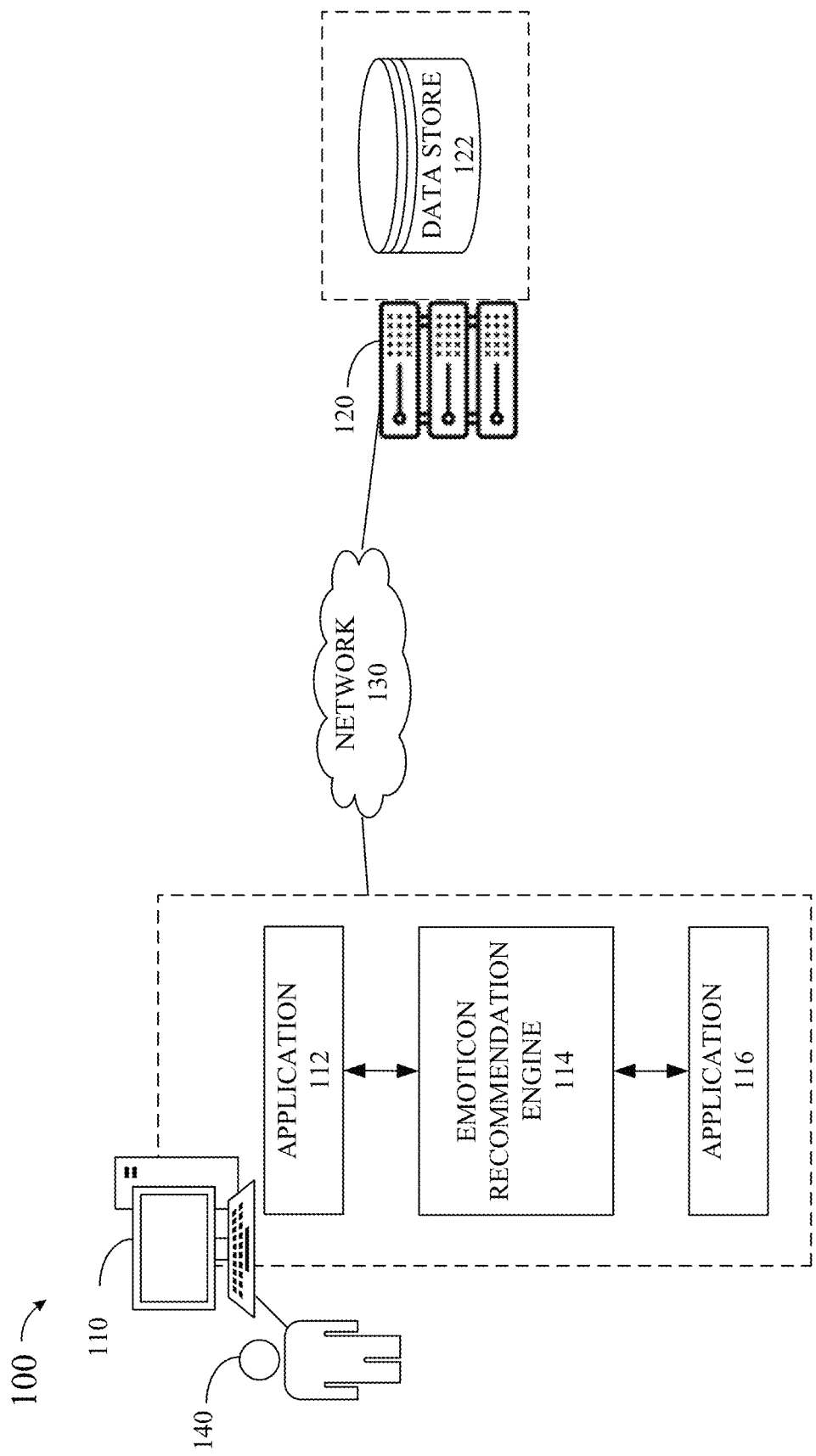
FIG. 1 depicts an example system upon which aspects of this disclosure may be implemented.

Emoticons are widely used by many different users in numerous scenarios to communicate with others. For example, users may use an emoticon to react to a message in a chat or react to a comment in a social media application. In another example, users may choose to respond to a text message, email message or instant message by using an emoticon instead of text. In yet another example, users utilize an emoticon in addition to text and/or other types of data (e.g., image, video, etc.) to enhance a message they are drafting. In all of these instances, the user would need to search for an emoticon that corresponds with what they are trying to express. In order to cover the wide variety of emotions and subject matters for which an emoticon can be used, communication platforms such as social media applications offer numerous emoticons. While this provides flexibility and increases user options, the large number of emoticons also results in the users having to spend a significant amount of time to find the right emoticon from among the many offered. To address this, some applications offer emoticon recommendations. However, currently available emoticon recommendations are server-based models, which require a significant amount of training data and as such are expensive to train. Moreover, these models are large, thus requiring a significant amount of computing resources to store and operate. Furthermore, the currently available models are generalized models that provide the same recommendations to a variety of different users. Thus, the resulting recommendations are not personalized. Still further, the currently available models require transmission of data, which often includes personal data (e.g., the content of messages, etc.) to a server, thus raising security and privacy concerns. As a result, there exists a technical problem of lack of adequate mechanisms for providing personalized emoticon recommendations in an efficient manner that is also secure and private.

To address these technical problems and more, in an example, this description provides technical solutions for providing a local emoticon recommendation engine that runs on a client device without dependency on cloud services. This is achieved by utilizing an emoticon recommendation engine that is compact enough for processing on the client-side. The emoticon recommendation engine utilizes a local machine learning (ML) model that is lightweight enough to run on a client device. The emoticon recommendation engine tokenizes messages sent by a user of a particular device, queries natural language libraries to create part-of-speech (POS) tag sets, continuously trains the local ML model where each POS tag set is associated with ranked emoticons, and applies the model to new messages to create and display selectable recommendations for emoticons. In this manner, the technical solution provides the technical advantage of reducing network bandwidth usage for emoticon recommendations, reducing computing resource usage due to more accurate emoticon predictions, and increasing more user data security and privacy due to localized processing of recommendations.

As will be understood by persons of skill in the art upon reading this disclosure, benefits and advantages provided by such implementations can include, but are not limited to, a technical solution to the technical problems of lack of mechanisms for efficiently and securely providing personalized emoticon recommendations. The technical solutions enable use of a local emoticon recommendation engine that is client-based instead of use of server-based models. This not only reduces or eliminates the need for network bandwidth usage, but also reduces the amount of computer processing and memory resources needed for making emoticon recommendations. Furthermore, since processing of the data occurs on the client side, there is no need to transmit the user's data to any servers, thus resolving privacy and security concerns. Moreover, because an individual user's data is used to train the ML model, the model is personalized for that user. Furthermore, since the model is only used for one user, the model can be continuously trained on the go, as user feedback data is generated. The technical effects include at least (1) improving the efficiency and accuracy of emoticon recommendation systems by providing a lightweight local emotion recommendation engine; (2) improving the efficiency of computing systems that process emotion recommendations by reducing or eliminating the need for network bandwidth usage and using fewer computing resources to operate the emoticon recommendation engine; and (3) increasing security and privacy by processing the user data locally.

As used herein, the terms "application," and "software application" or "platform" may refer to any software program that provides options for performing various tasks or functionalities.

FIG. 1 illustrates an example system 100, upon which aspects of this disclosure may be implemented. The system 100 includes a client device 110 and a data storage server 120. While shown as one server, the server 120 may represent a plurality of servers that provide data storage. The client device 110 may be a type of personal, business or handheld computing device having or being connected to input/output elements that enable a user to interact with various applications (e.g., application 112 or application 116). The client device 110 may be utilized by a user 140 to communicate with other users via one or more applications such as the application 112 or 116. Examples of suitable client devices 110 include but are not limited to personal computers, desktop computers, laptop computers, mobile telephones, smart phones, tablets, phablets, smart watches, wearable computers, gaming devices/computers, televisions; and the like. The internal hardware structure of a client device is discussed in greater detail with respect to FIGS. 6 and 7.

The client device 110 includes a local application 112 and a local application 116. The applications 112 and 116 are software programs executed on the client device that configure the device to be responsive to user input to allow a user to communicate with other users, where the communications can include emoticons. Examples of suitable applications include, but are not limited to a social media application, virtual meeting application, email application, instant messaging application, text messaging application, word processing application, presentation application, collaboration application, and the like. Each of the applications 112 and 116 include a feature that allows the user to react to an item (e.g., message, comment, video, text, slide, and the like) using an emoticon and/or a features that allows the user to provide input (e.g., respond to a message, draft a message, comment on an item, etc.) that can include an emoticon. To achieve this, each of the applications 112 and 116 may include or be connected to a library of emoticons that can be used in each application. It should be noted that while only two applications are depicted in the client device 110, fewer or more than two applications that utilizes emoticons may be offered by the client device 110.

The client device 110 also includes an emoticon recommendation engine 114, which provides local emoticon recommendation for each of the applications 112 and 116. In some implementations, different emoticon recommendation engines are used for the different applications 112 and 116. The emoticon recommendation engine 114 may be incorporated with the applications 112 and 116 (e.g., via an application programming interface (API)) to enable the applications 112 and 116 to utilize the emoticon recommendation services of the emoticon recommendation engine 114.

The emoticon recommendation engine 114 provides local personalized emoticon recommendations. This involves the user of a local ML model that is trained locally and on the client device 110 to provide personalized recommendations for the user 140. The internal structure and details of operations of the emoticon recommendation engine 114 are discussed in more details with respect to FIGS. 2A-2B.

The client device 110 is connected to the server 120 via a network 130. The network 130 may be a wired or wireless network(s) or a combination of wired and wireless networks that connect one or more elements of the system 100. The server 120 is connected to or includes the data store 122 which functions as a repository in which databases relating to user data are stored. As such, the data store 122 may function as a cloud storage site for user data. Although shown as a single data store, the data store 122 may be representative of multiple storage devices and data stores which are accessible by the client device 110.

In some implementations, the data store 122 is used as a cloud storage medium for temporary storage of the ML model(s) used by the emoticon recommendation engine 114. This enables cross-platform use of the ML model(s). This may involve exporting the ML model(s) as a software development Kit (SDK) to the data store 122 and then allowing other applications to retrieve the model(s) for use. For example, when the user 140 utilizes multiple client devices, the user may grant permission for cross-platform use of the ML model(s), which enables the ML model(s) to be exported to the data store 122 and then retrieved and used by an application on the user's second client device. In some implementations, exporting to the data store 122 enables merging of various local ML models. That is because since the ML models are locally trained, each model may have some different information. The different ML models used by different client devices of the user and/or by different applications on the same client device may be exported to the data store 122 and merged together on an occasional basis (e.g., every 24 hours or once a week) to provide an updated model to various applications and client devices associated with the user. The emoticon recommendation engine 114 may compare the retrieved model(s) with its local ML model and update the local ML model based on the comparison to provide a merged model. The transfer of the ML model(s) to the data store and back to a local device may require receiving consent from the user. However, since only the ML model is transferred to the data store 122 and not any user date, this implementation still does not raise any security or privacy concerns.

Figure 2A:
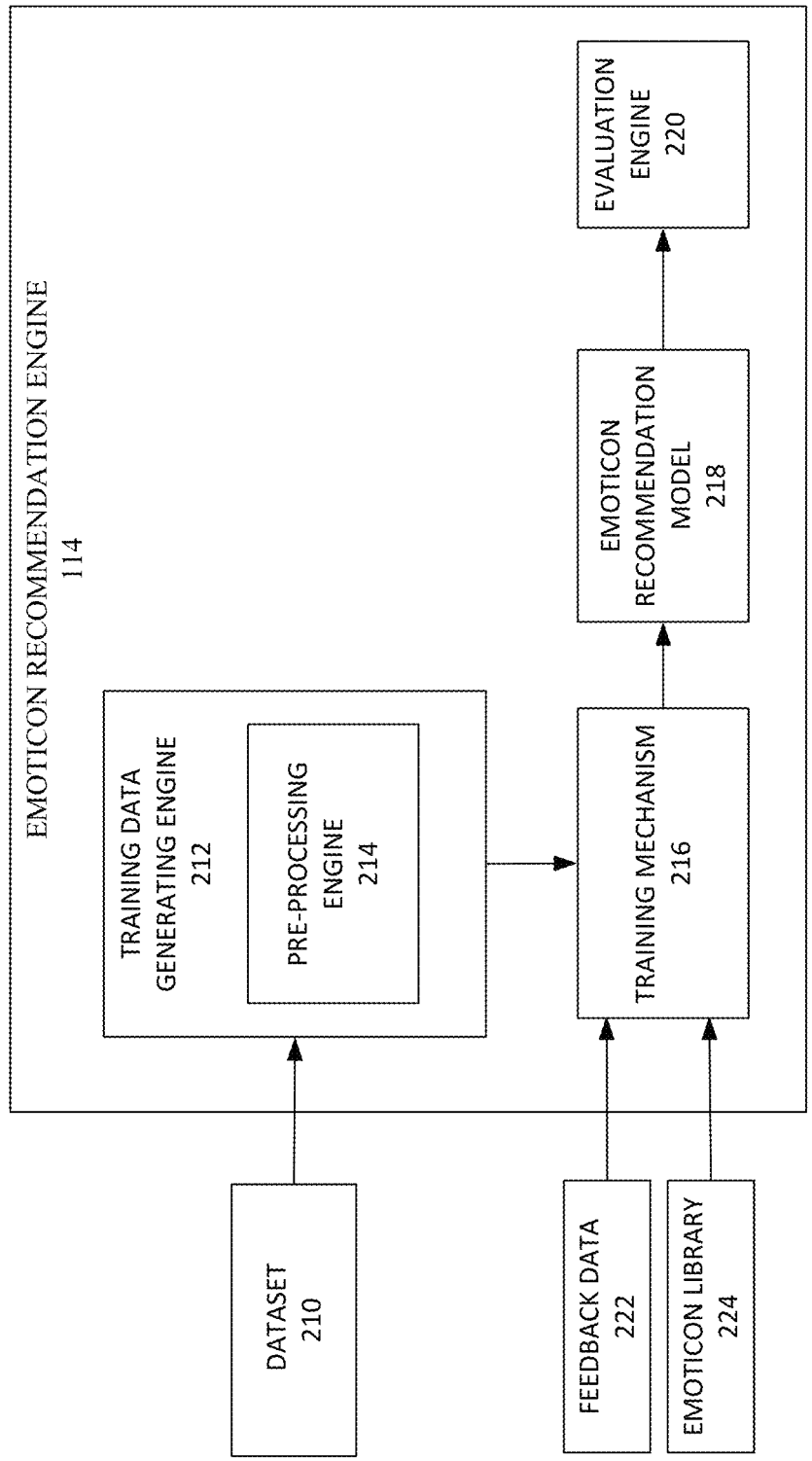
FIG. 2A depicts an example of how a local emoticon recommendation model is trained.

FIG. 2A depicts an example of how the local emoticon recommendation model is trained. In an example, the initial model is a model with zero states and the model is trained locally on the client device. In alternative implementations, the model is a light pre-trained model. In an example, the initial model is a SwiftKey model which is readily available for zero states. To begin the training process, a dataset 210 is first created or collected. The dataset 210 may be a dataset of text segments and a corresponding emoticon for each text segment. This dataset may be created based on data collected from the user's use of one or more applications. For example, data may be retrieved from the user's use of any application that offers use of emoticons. Alternatively, the dataset may be created from synthetic data for simplicity. For example, the emoticon recommendation engine 114 may be provided with a synthetic dataset 210. The dataset 210 may be a small dataset to provide some initial training for the model. FIG. 3A depicts an example of a dataset 210 that may be used for an initial training of the emoticon recommendation model 218. As depicted in FIG. 3A, the dataset includes a text segment such as "I'm so happy today" and an emoticon associated with the text segment.

In some implementations, the dataset 210 is provided to a training data generating engine 212 that prepares that data for training the model. Preparing the dataset includes pre-processing the data, which may be achieved by the pre-processing engine 214. The dataset 210 is pre-processed by converting the text into numerical features and encoding the emoticons as labels. This may be achieved by using a textual data encoding engine and an emoticon conversion engine such as those discussed in more detail with respect to FIG. 2B. The textual data encoding engine and an emoticon conversion engine may be included in the training data generating engine 212 and/or the pre-processing engine 214. FIG. 3B depicts an example of mapping of emoticons to numerical labels and converting text segments to numerical features. As shown, each emoticon in the dataset is assigned a numerical label. The text is then converted to numerical features, before the emoticon labels are mapped to the numerical features of the text segments to generate a training dataset that can be used to train the emoticon recommendation model 218.

In some implementations, the generated training dataset is transmitted to the training mechanism 216 to train the emoticon recommendation model 218. As mentioned before, the emoticon recommendation model 218 may initially be a SwiftKey model or any other predictive artificial intelligence (AI) model with zero states. Alternatively, the model may be lightweight pre-trained model. In an example, the emoticon recommendation model 218 is a decision tree classifier. The training mechanism 216 uses the generated training dataset to provide initial training for the model. Additionally, the training mechanism 216 may use data from the emoticon library 224 and feedback data 222 to provide ongoing training for the model. In some implementations, the training mechanism 216 uses the labeled training data to train the model via deep neural network(s) or other types of training. The initial training may be performed in an offline stage. In an example, initial training is performed using the following code:

const dt=new DecisionTree({data: X, target: y});
dt.train( );.

Ongoing training may be achieved by further training the model when there is a change in the emoticon library 224. The emoticon library 224 may be a library of emoticons that are available for use in a given application. The emoticon library 224 is retrieved from the application (e.g., applications 112/116). However, since applications may be updated on an occasional basis to update their emoticons, the emoticon library of a given application is compared against the emoticon library used for the emoticon recommendation engine 114 to identify any changes between the two emoticon libraries and update the emoticon library 224, as needed. The updated emoticon library 224 is then used to provide updated training for the emoticon recommendation model 218. The updated emoticon library 224 may need to be pre-processed (e.g., via the pre-processing engine 214) to encode the emoticons into labels. In some implementations, the emoticon library 224 is stored in a storage medium associated with the emoticon recommendation engine 114. Feedback data 222 may include data about emoticons selected and/or rejected by the user, as the user uses the application(s). For example, when the user accepts an emoticon recommendation, data about the user's selection of the emoticon, as well as the text data and contextual data associated with the emoticon may be stored as feedback data 222 and used for further training of the model 218. In an example, the feedback data 222 keeps track of acceptance and rejection ratios for each recommended emoticon. If a user rejects a recommended emoticon a specific number of times or a specific percentage of times, the emoticon may be removed from the library and/or the weight given to the emoticon by the model may be reduced, when ranking the recommended emoticons.

In some implementations, once the emoticon recommendation model 218 has been trained, the performance of the model is evaluated via the evaluation engine 220. Evaluation is achieved by providing inputs to the trained emoticon recommendation model and evaluating the outputs via one or more evaluation metrics such as precision, recall, F1-score, or user engagement parameters. Alternatively or additionally, the evaluation engine 220 may implement an A/B testing mechanism to measure user satisfaction with the recommended emoticons. This may be achieved by including a mechanism for receiving user feedback in the user interface (UI) screen of the application (e.g., thumps up or thumps down button or text box for receiving textual feedback). Because the training and evaluation process is performed locally on the client device, privacy and security concerns regarding the use of the user's data are alleviated.

Figure 2B:
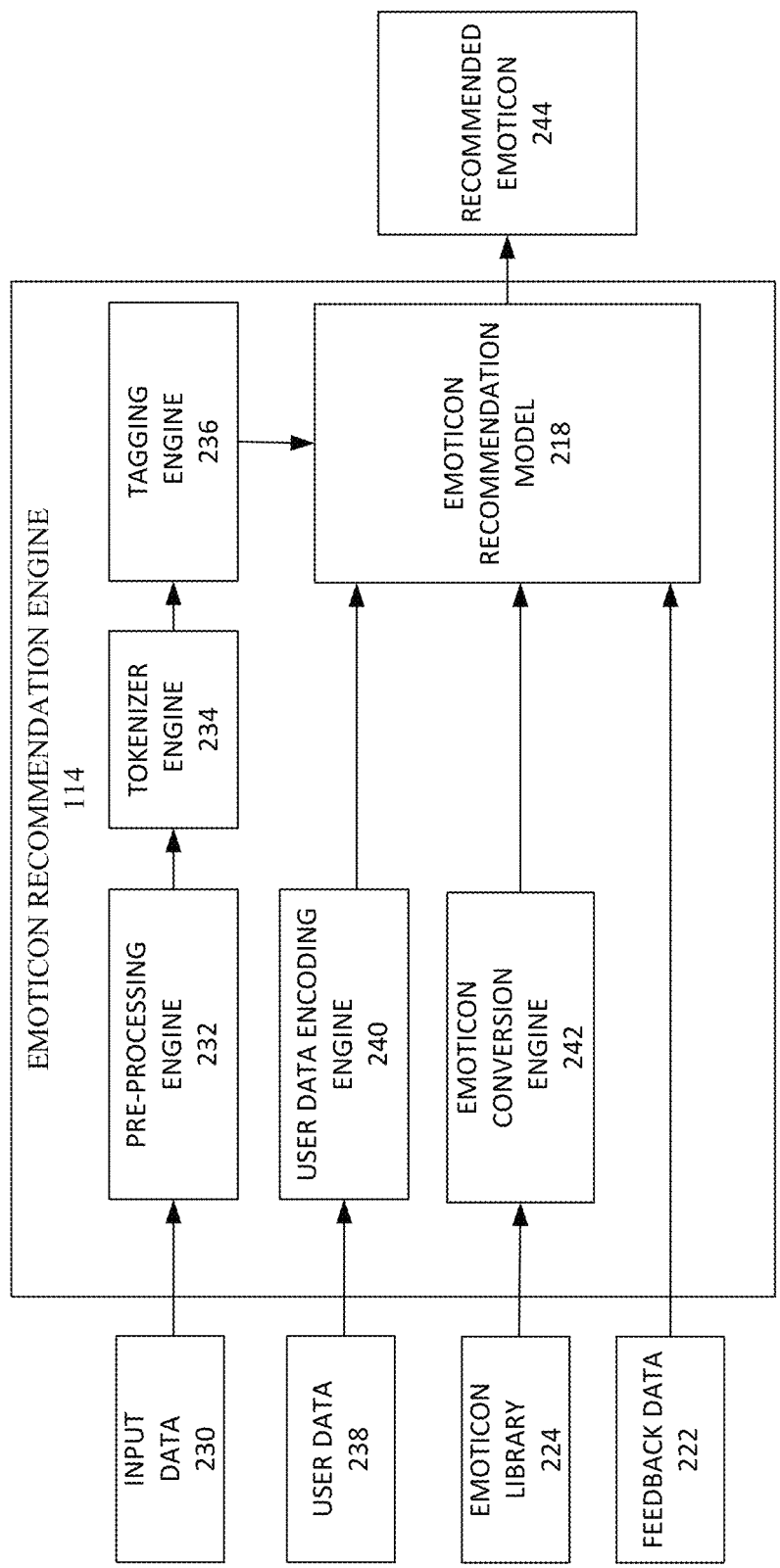
FIG. 2B depicts an example data flow between some elements of an example system that provides local personalized emoticon recommendations.

FIG. 2B depicts an example data flow between some elements of an example system that provides local personalized emoticon recommendations. In an example, the process is initiated when a user using an application that offers emoticon use begins providing input. The input may be text or other types of input (e.g., image, video, voice, etc.) and may be entered by directly entering input into a UI element such as an input box or attaching a file (e.g., an image) to a message. In another example, the process is initiated when the user utilizes an input/output element to hover over a UI element or otherwise select a UI element that displays emoticon recommendations or a list of emoticons. The user's actions in these instances indicates a desire or potential intent to utilize emoticons. This results in the input data 230 and, in some implementations, the user data 238 being transmitted from the application to the emoticon recommendation engine 114. The input data 230 includes data directly provided by the user (e.g., a message entered into an input box) and/or contextual data associated with the input data. For example, if the user is responding to a message, the message to which the user is responding may also be provided as part of the input data to provide context. When the user input is part of a larger message or email thread, the entire or part of the thread may be included in the input data as contextual data. In an example, a part of the thread that is more recent may be included (e.g., messages exchanged in the last month). In some implementations, the input data is a message or text segment to which the user is trying to react using an emoticon. In this case, the user input is the message and may include previous messages and/or reactions to those message in the message thread.

The input data 230 is provided to the pre-processing engine 232 for pre-processing, which may include removing extraneous words (e.g., stop words), removing punctuation and/or removing special characters. Pre-processing may also include converting audio data to text, in instances where the input is provided via an audio input mechanisms (e.g., voice command). In instances where the input data includes an image, pre-processing may include extracting text from the image or automatically generating a textual description of the image. This may involve use of a lightweight ML model. Other pre-processing steps may also be performed to prepare the data for use by the emoticon recommendation model, as needed. Once the input data is pre-processed, the pre-processed input data is transmitted to the tokenizer engine 234.

The tokenizer engine 234 receives the pre-processed input data and tokenizes the text data by using a known tokenizing mechanism that converts the text into words. The tokenized words are then provided to a tagging engine 236 that tags the tokenized words with their POS tags using a POS tagging mechanism. In some implementations, this process is achieved by utilizing the Natural node in the JavaScript library. The Natural library provides natural language processing capabilities which include POS tagging. The Natural library can be installed using npm (e.g., npm install natural). Once installed, the Natural library can be used to get POS tags for words in Node.js. FIG. 3C depicts an example of using the Natural library to tokenize and tag words. As depicted, the tokenizer can be constructed as an instance of a word tokenizer, as needed. Furthermore, the natural library can be used as a Brill POS tagger to add POS tags to words. A sample text such as "The quick brown fox jumps over the lazy dog" can then be tokenized into words using the tokenizer (e.g., the tokenizer engine 234). The words are then tagged using the POS tagger (e.g., tagging engine 236). Other mechanisms for tokenizing and tagging the words may also be used.

Processing the input data via the tokenizer engine 234 and tagging engine 236 results in an array of word-POS tag pairs. Each pair of word-POS tag consists of a word and its corresponding POS tag. FIG. 3D depicts an example of a set of word-POS tag pairs. As depicted, each word in the sample text has a corresponding POS tag. For example, the word "The" has a "DT" tag, while the word "brown" has an "NN" tag. The POS tags identify the type of word. An example of a few common POS tags used in the Penn Treebank POS tag set is provided below.

DT: Determiner
JJ: Adjective
NN: Noun

VBZ: Verb, 3rd person singular present

IN: Preposition or subordinating conjunction

.: Punctuation (period)

The word-POS tag pairs are then transmitted to the emoticon recommendation model 218 as an input. The tag pair list helps identifies words in the text that may correspond to an emoticon and for which an emoticon should be searched. For example, in the sample text of "the quick brown fox jumps over the lazy dog", the words "brown", "fox" and "dog" which are identified in the list as being nouns may be identified as potentially corresponding to emoticons for which an emoticon should be searched and/or identified. FIG. 3E depicts an example of providing an input text to an emoticon recommendation model and receiving a recommended emoticon as an output.

In some implementations, in addition to the tokenized and tagged input data, one or more of the user data 238, feedback data 222 and/or the emoticon library 224 is also provided to the emoticon recommendation model 218 as an input. The user data 238 may be user history data, data based on other factors that indicate use behavior and/or user preference data. User history data may be retrieved from a data store that stores a history of user's use of emoticons in messages, and the like. User behavior may be any data that provides information about trends in the user's behavior, and user preference data may be obtained directly (e.g., via user input) or as part of the user's profile or other data sources. The user data 238 is encoded via the user data encoding engine 240 for use by the emoticon recommendation model 218. By utilizing the user data 238, the system ensures that the emoticon recommendations are personalized for the user. Techniques such as matrix factorization of the user data embeddings are then employed to utilize the user data in making personalized recommendations. Furthermore, the emoticons in the emoticon library 224 are converted into numerical labels by the emoticon conversion engine 242 before being made available to the emoticon recommendation model 218 for selection.

In some implementations, the feedback data 222 includes frequency numbers for the most recently used emoticons and/or the most frequently used emoticons. These numbers identify one or more (e.g., two) most recently used emoticons and one or more (e.g., two) most frequently used emoticons. This information may be provided to the emoticon recommendation model 218 provide a weight of the number of recommended emoticons is high or to otherwise help in ranking the identified emoticons. In some implementations, the frequency numbers in the feedback data 222 also help change the order of emoticons displayed in a list of static emoticons. For example, in some instances, an application may display a list of static emoticons (e.g., without running the emoticon recommendation model). This list may be updated using the frequency numbers that identify the most recently used emoticons and most frequently used emoticons by the user such that even the static list is personalized for the user.

Based on the provided input, the emoticon recommendation model 218 selects one or more emoticons from the emoticon library 224 as an output. In some implementations, the emoticon recommendation model 218 ranks the recommendations based on one or more weight factors such as those discussed above. The output is provided as a recommended emoticon 244. In some implementations, the output is transmitted to the application from which the request was initially received for display to the user.

Figure 4A:
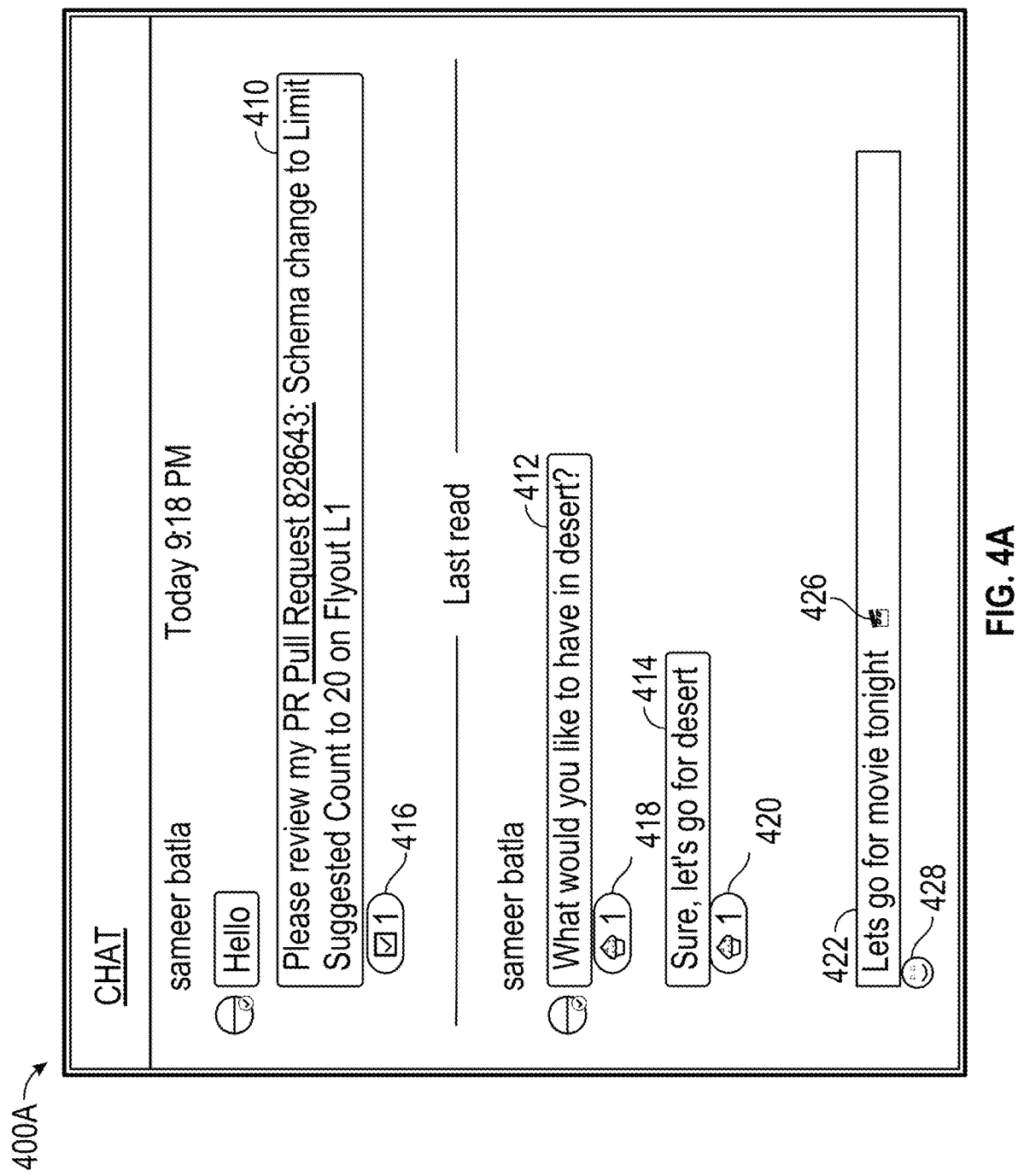
FIGS. 4A-4C depict example GUI screens of an application that provides personalized emoticon recommendations via a local model.
Figure 4B:
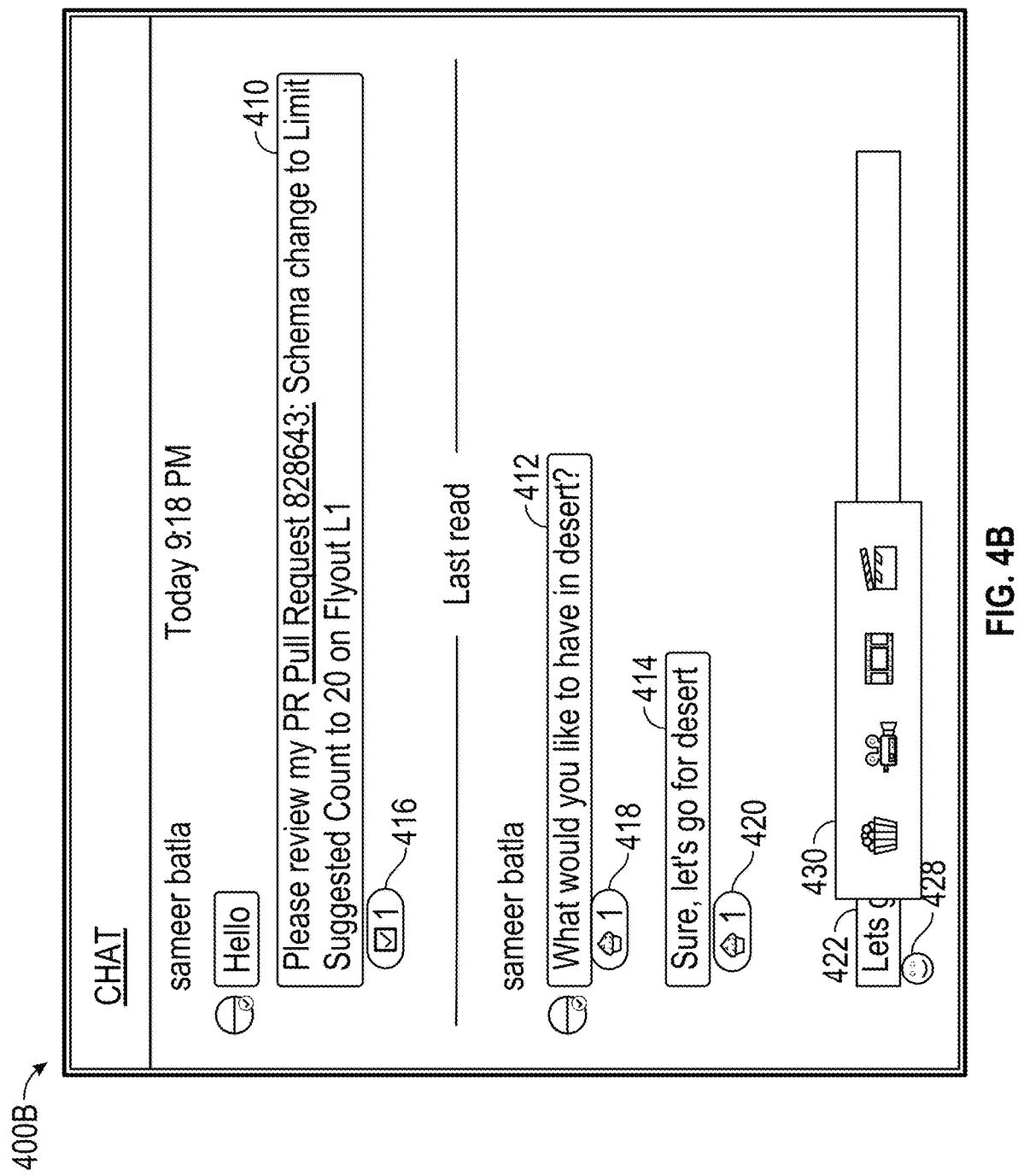
Figure 4C:
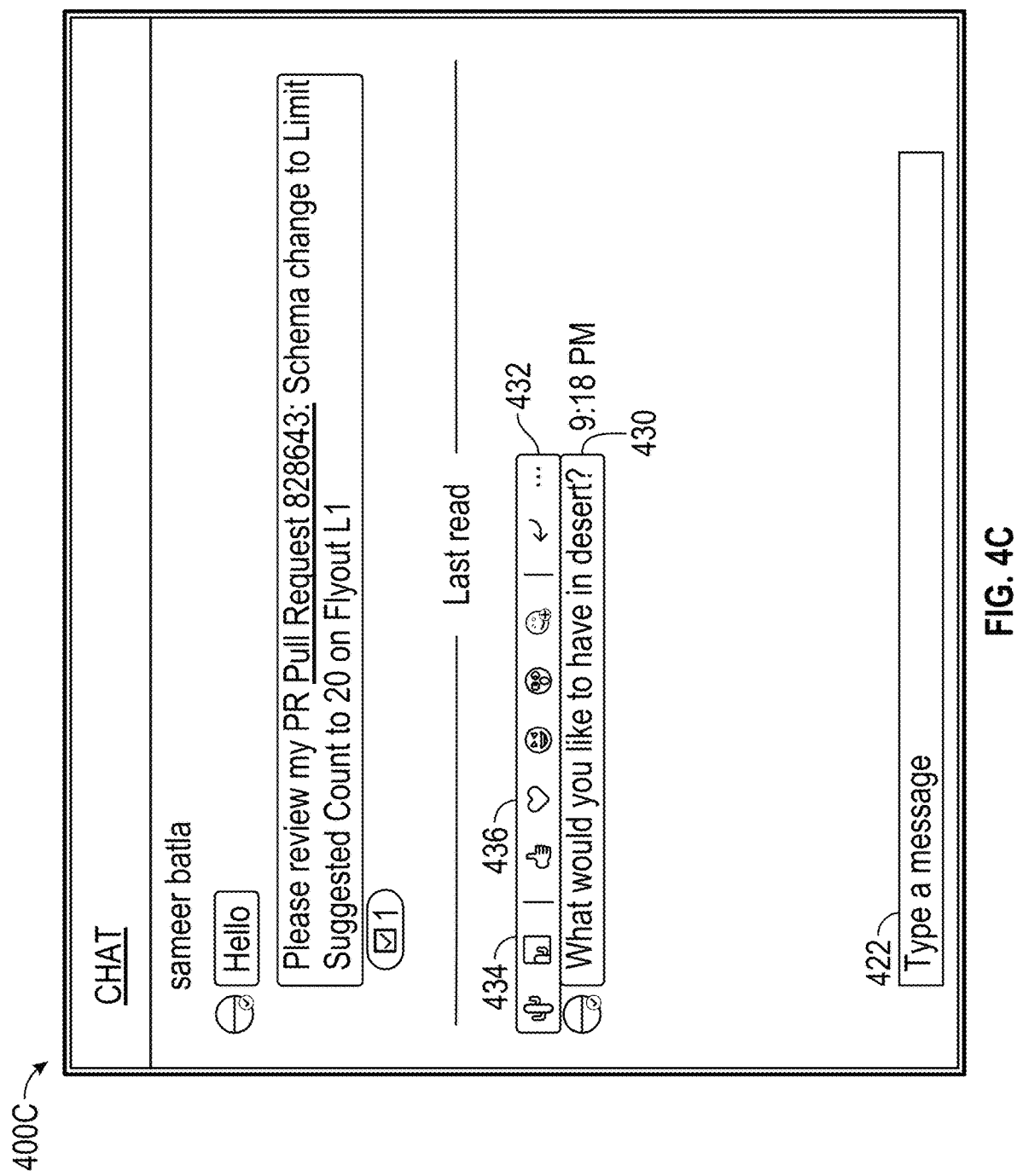

FIGS. 4A-4C depict example GUI screens of an application that provides personalized emoticon recommendations via a local model. In some implementations, the GUI screen 400A of FIG. 4A is displayed by an application that provides an option for instant messaging (e.g., chatting) between two or more individuals. As such, the GUI screen 400A is displayed to a user who is chatting with another user. The GUI screen 400A may display a history of the two individuals' chats. As such, the GUI screen 400A displays a plurality of messages exchanged between the users such as the messages 410, 412 and 414 which are sent by the other user. In some implementations, the user who is receiving and viewing the messages can react to each message in the instant communications screen via an emoticon. This is depicted in GUI screen 400A by the emoticon 416 which is a reaction to message 410, emoticon 418 which is a reaction to the message 412 and the emoticon 420 which is a reaction to the message 414.

The user may also utilize a UI element such as the input box 422 to provide an input such as text. In some implementations, as the user begins to enter text, the application automatically transmits the entered text and the one or more of the previous messages and/or their corresponding emoticon reactions to the emoticon recommendation engine to receive an emoticon recommendation. When an emoticon is identified as corresponding to the entered text, the emoticon may be automatically displayed in the input box 422 as a recommendation. This is depicted by the emoticon 426, which is displayed adjacent to the entered text in the input box 422. The user can then select the recommended emoticon by, for example, pressing enter or another keyboard key or ignore the recommendation and continue to enter their text. Additionally or alternatively, the user may utilize the UI element 428 to enable display of a list of emoticons. This invokes a request for emoticon recommendation to the local emoticon recommendation engine, which in turn utilizes the input data and/or the context of the message thread to identify emoticon recommendations. Thus, when the user selects the UI element 428 a list of one or more recommended emoticons are displayed. This is depicted in GUI screen 400B of FIG. 4B, in which the UI element 430 displays a list of recommended emoticons. These emoticons are emoticons that are identified by the local emoticon recommendation model as corresponding to the input data, contextual data, feedback data and/or user data for the user who is entering the data. Thus, the result is provided locally and is personalized for the user.

FIG. 4C depicts a GUI screen 400C which displays an alternative scenario in which recommended emoticons may be presented to a user. As discussed before, emoticons can be used to react to a message. Thus, the user may select to react to message 430 of GUI screen 400C via an emoticon. To achieve this, the user can invoke a UI element that is associated with display of emoticons or perform another action that results in the display of emoticons. In an example, hovering over a message such as the message 430 results in the display of recommended emoticons. Thus, the user may hover over the message 430 to invoke the display of the UI element 432. The UI element 432 displays a list of recommended emoticons and/or most recently used and/or most frequently used emoticons. In an example, the UI element 432 includes a portion 434 that displays a list of recommended emoticons. These emoticons are identified by a local emoticon recommendation model based on the text of the message 430, context of the message thread, user data and/or feedback data. The UI element 432 also includes a portion 436 which displays one or more most recently used emoticons, most frequently used emoticons or a combinations thereof. In this manner, the user is presented with emoticons that are most likely to correspond to the user's needs and requirements. This is achieved by using a local model and using the user's personal information, while keeping the user's data safe and private.

Figure 5:
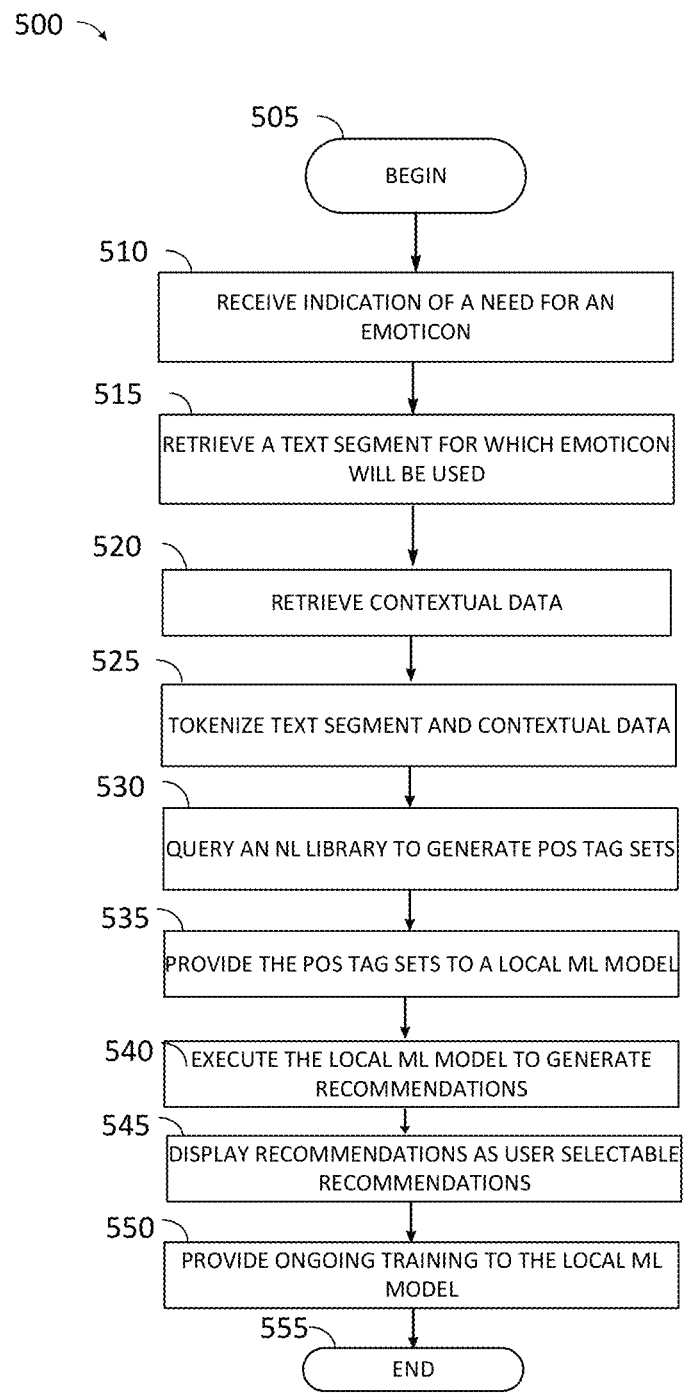
FIG. 5 is a flow diagram depicting an exemplary method for providing personalized emoticon recommendations.

FIG. 5 is a flow diagram depicting an exemplary method 500 for providing personalized emoticon recommendations. The steps of method 500 are performed by a client device such as the client device 110 of FIG. 1. More specifically, one or more steps of the method 500 are performed by one or more of the applications 112, 116 and emoticon recommendation engine 114 of FIG. 1. The method 500 begins, at 505, and proceeds to receive an indication of a need for a user to utilize an emoticon in a communication between the user and one or more other users, at 510. This may involve receiving a request or indication via a user interface screen of an application installed on the client device (e.g., applications 112, 116). The indication may be an explicit user request, by for example, clicking on an emoticon icon, or hovering over a message to which the user desires to react via an emoticon. Alternatively, the indication may be received implicitly and without user request, for example, when the user begins entering text in an input box, the text may be automatically interpreted as an indication to receive emoticon recommendations for the text and/or for context associated with the text (e.g., previous messages exchanged in the message thread). Upon receiving the indication, a text segment for which the emoticon needs to be used is retrieved, at 515. The text segment may be the text input by the user or may be a message or comment to which the user intends to react with an emoticon.

After retrieving the text segment, method 500 proceeds to retrieve contextual data, at 520. The contextual data may include previous messages or communications with the same user (e.g., previous messages in the message thread), previous reactions to the messages in the message thread and the like. Once the text segments and the contextual data are retrieved, method 500 proceeds to tokenize the text segment and the contextual data into one or more words, at 525. A natural language library such as the natural library of the JavaScript library is then queried to generate a POS tag set for each of the one or more words, at 530. The POS tag set generates a POS tag for each word for the one or more generated words.

The generated tag sets are then provided to a local ML model that is trained for providing emoticon recommendations based on POS tag sets, at 535. Method 500 then proceeds to execute the local ML model on the client device to provide one or more emoticon recommendations for the text segment, at 540. The one or more emoticon recommendations are displayed to the user as user selectable recommendations, at 545. In an example, the selectable recommendations are displayed next to existing emoticons. In another example, one or more selectable recommendations are displayed adjacent to a list of most frequently used and/or more recently used emoticons. Method 500 also provides ongoing training to the local ML model, at 550, before ending at 555. Training the local ML model includes associating each POS tag set in a list of POS tag sets with ranked emoticons.

Figure 6:
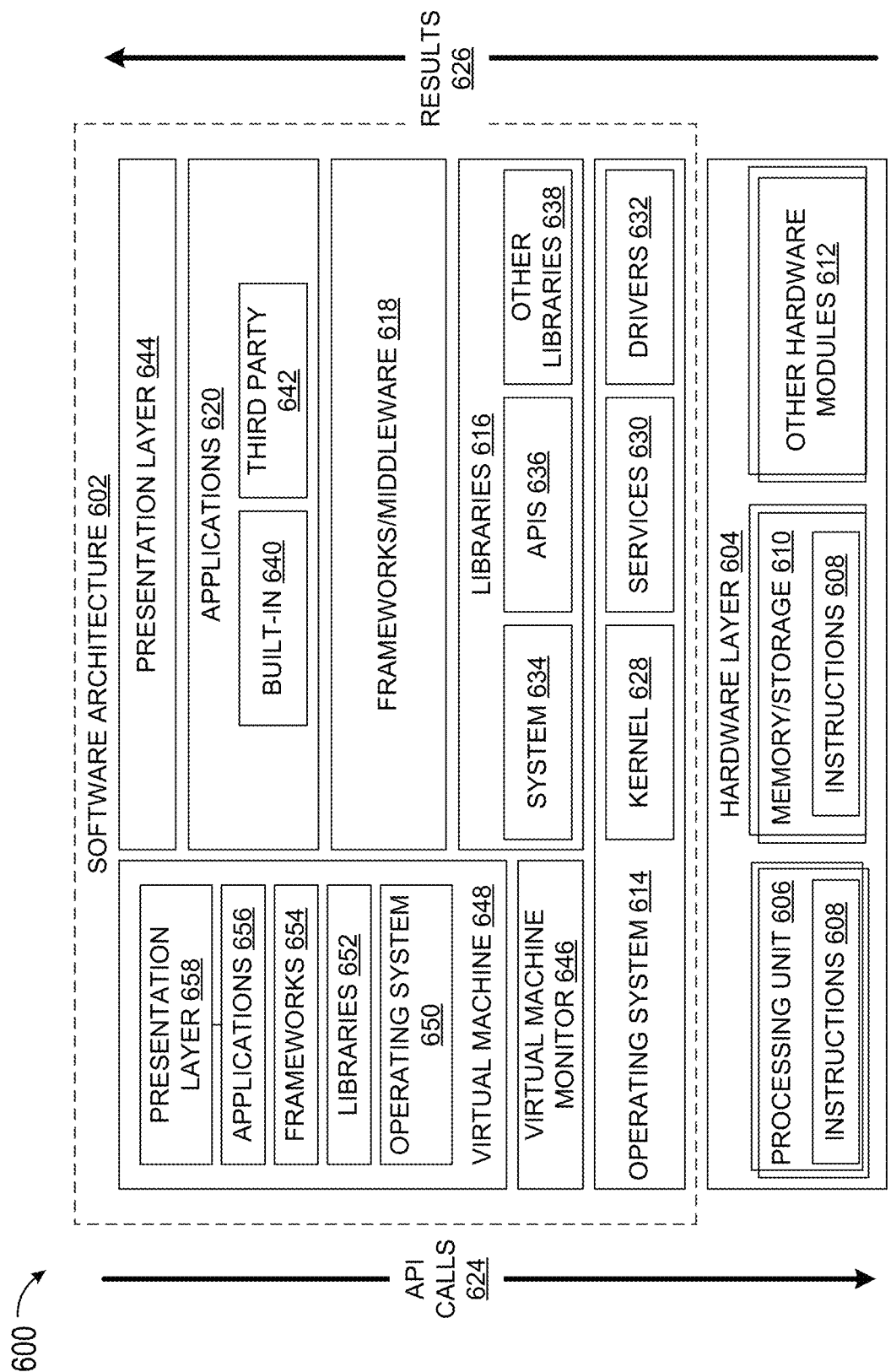
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture, and it will be appreciated that many other architectures may be implemented to facilitate the functionality described herein. The software architecture 602 may execute on hardware such as client devices, native application providers, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular system. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine depicted in block diagram 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
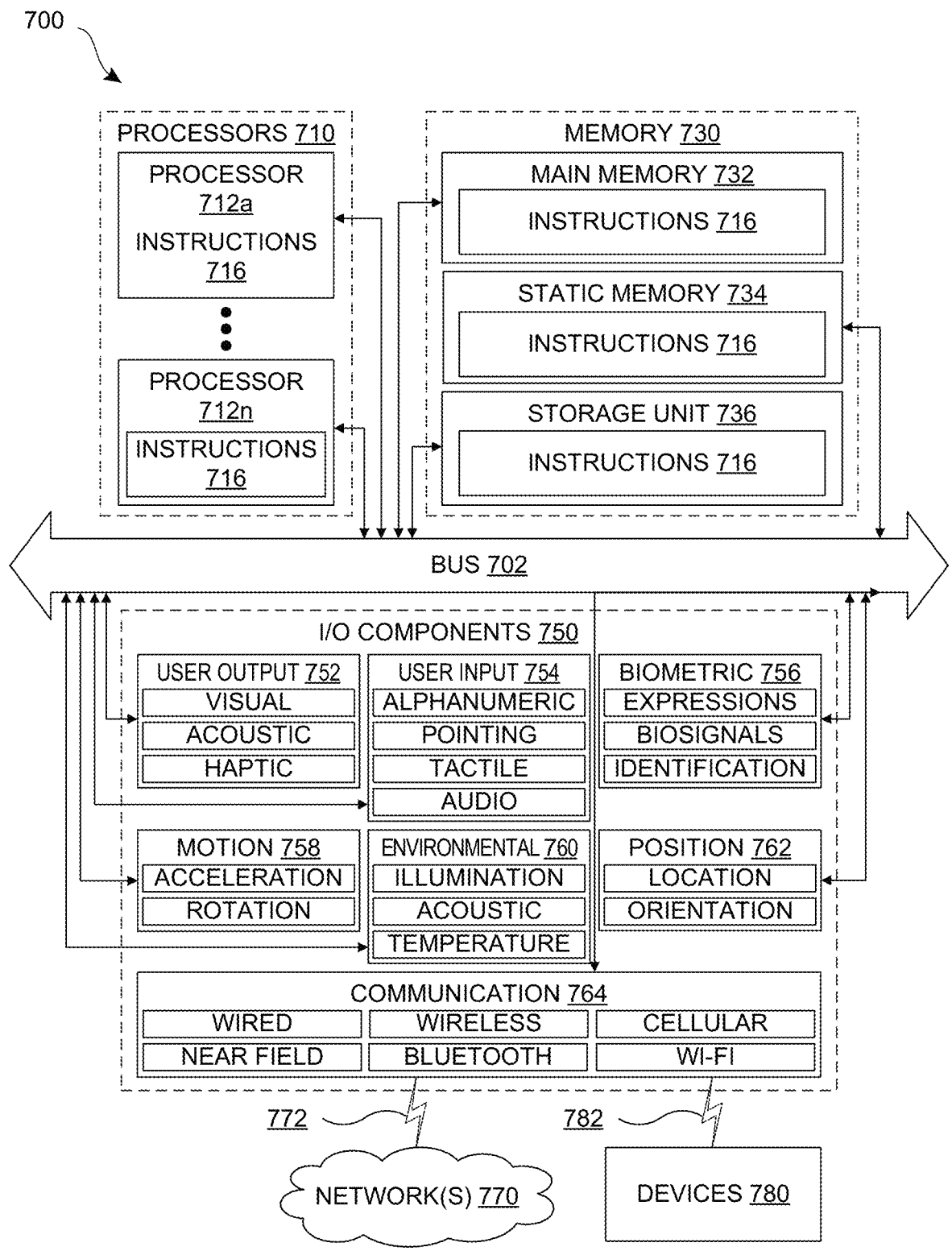
FIG. 7 is a block diagram illustrating components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers). The motion components 758 may include, for example, motion sensors such as acceleration and rotation sensors. The environmental components 760 may include, for example, illumination sensors, acoustic sensors and/or temperature sensors.

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 764 such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-7) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A client device comprising:
   a processor; and
   a memory in communication with the processor, the memory comprising executable instructions that, when executed by the processor alone or in combination with other processors, cause the client device to perform functions of:
   receiving input data at an application including a local emoticon recommendation engine on the client device of a user that offers use of emoticons in communications between the user and other users;
   pre-processing the input data via the local emoticon recommendation engine by removing at least one of stop words, punctuation, and special characters, to generate one or more text segments from the input data;
   following the pre-processing, tokenizing the one or more text segments via the local emoticon recommendation engine to generate one or more tokenized words from the one or more text segments;
   tagging the tokenized words via the local emoticon recommendation engine by querying a natural language library to generate a part-of-speech (POS) tag set for each of the one or more tokenized words;
   providing the generated POS tag set to a local machine learning (ML) model trained for providing emoticon recommendations based on the POS tag set and a library of emoticons;
   executing the local ML model on the client device to provide one or more emoticon recommendations;
   displaying the one or more emoticon recommendations to the user as user selectable recommendations; and
   implementing ongoing training on the local ML model, wherein training the local ML model includes associating each POS tag set in a list of POS tag sets with ranked emoticons.

2. The client device of claim 1, wherein the input data is a message sent from one of user to other users.

3. The client device of claim 1, wherein the input data includes contextual data.

4. The client device of claim 3, wherein the contextual data includes a number of previous messages between the users.

5. The client device of claim 1, wherein the local ML model identifies emoticons that correspond to nouns identified in the input data.

6. The client device of claim 1, wherein the local ML model provides emoticon recommendations based on the POS tag set and at least one of user data and feedback data.

7. The client device of claim 6, wherein the user data includes at least one of user history data, user behavior data and user preference data for a user associated with the client device.

8. The client device of claim 6, wherein the feedback data includes at least one of data about a user's selection or rejection of previously recommended emoticons, a frequency number of emoticons recently used, and a frequency number of emoticons most often used by the user.

9. The client device of claim 1, wherein the emoticon recommendation engine includes an emoticon conversion engine for converting emoticons from the library for emoticons into numerical labels before being made available to the ML model.

10. A method for providing local emoticon recommendations by a client device, the method comprising:
   receiving input data at an application including a local emoticon recommendation engine on the client device of a user that offers use of emoticons in communications between the user and one or more other users;
   pre-processing the input data via the local emoticon recommendation engine by removing at least one of stop words, punctuation, and special characters, to generate one or more text segments for which an emoticon will be used from the input data;
   receiving an indication of a likelihood for the user to utilize the emoticon in a communication between the user and the one or more other users, the indication being received via a user interface screen of an application installed on the client device;
   retrieving contextual data associated with the one or more text segments;
   following the pre-processing, tokenizing the one or more text segments and the contextual data via the local emoticon recommendation engine to generate one or more tokenized words from the one or more text segments and the contextual data;
   tagging the tokenized words via the local emoticon recommendation engine by querying a natural language library to generate a part-of-speech (POS) tag set for each of the one or more tokenized words;

providing the generated POS tag set to a local machine learning (ML) model trained for providing emoticon recommendations based on the POS tag set;

executing the local ML model on the client device to provide one or more emoticon recommendations;

displaying the one or more emoticon recommendations to the user as user selectable recommendations; and implementing ongoing training to the local ML model, wherein training the local ML model includes associating each POS tag set in a list of POS tag sets with ranked emoticons.

11. The method of claim 10, wherein the selectable recommendations are displayed alongside existing emoticons.

12. The method of claim 10, wherein the one or more emoticon recommendations are ranked based on one or more weight parameters.

13. The method of claim 10, wherein the local ML model utilizes an emoticon library to provide recommendations.

14. The method of claim 11, wherein emoticons in the emoticon library are encoded as labels.

15. The method of claim 11, wherein the emoticon library is compared with emoticons in an emoticon library of the application to determine if the emoticon library should be updated.

16. The method of claim 10, wherein the local ML model is made available for emotion recommendations in one or more other applications executed on the client device.

17. The method of claim 10, wherein the local ML models is exported to a cloud data storage medium to enable cross-application use of the local ML model for the user.

18. A non-transitory computer readable medium on which are stored instructions that, when executed, cause a programmable device to perform functions of:

receiving input data at an application including a local emoticon recommendation engine on a client device of a user that offers use of emoticons in communications between the user and other users;

pre-processing the input data via the local emoticon recommendation engine by removing at least one of stop words, punctuation, and special characters, to generate one or more text segments from the input data;

following the pre-processing, tokenizing the one or more text segments via the local emoticon recommendation engine to generate one or more tokenized words from the one or more text segments, the one or more text segments being received as part of an input data received by an application that offers use of emoticons in communications between users;

tagging the tokenized words via the local emoticon recommendation engine by querying a natural language library to generate a part-of-speech (POS) tag set for each of the one or more tokenized words;

providing the generated POS tag set to a local machine learning (ML) model trained for providing emoticon recommendations based on the POS tag set and a library of converted emoticons;

executing the local ML model on the programmable device to provide one or more emoticon recommendations;

displaying the one or more emoticon recommendations to the user as user selectable recommendations; and providing ongoing training to the local ML model, wherein training the local ML model includes associating each POS tag set in a list of POS tag sets with ranked emoticons.

19. The non-transitory computer readable medium of claim 18, wherein the local ML model is a classifier model.

20. The non-transitory computer readable medium of claim 18, wherein the input data includes contextual data.

* * * * *